US007277915B2

(12) United States Patent
de Boor et al.

(10) Patent No.: US 7,277,915 B2
(45) Date of Patent: Oct. 2, 2007

(54) APPLICATION-BASED PROTOCOL AND PROXY SELECTION BY A MOBILE DEVICE IN A MULTI-PROTOCOL NETWORK ENVIRONMENT

(75) Inventors: Adam R. de Boor, Alameda, CA (US); Nitu Choudhary, Mountain View, CA (US); Peter C. King, San Mateo, CA (US)

(73) Assignee: Openwave Systems Inc., Redwood City, CA (US)

( * ) Notice: Subject to any disclaimer, the term of this patent is extended or adjusted under 35 U.S.C. 154(b) by 700 days.

(21) Appl. No.: 10/292,281

(22) Filed: Nov. 11, 2002

(65) Prior Publication Data

US 2005/0228870 A1    Oct. 13, 2005

(51) Int. Cl.
*G06F 15/13* (2006.01)
(52) U.S. Cl. .................... 709/203; 709/202; 709/225; 709/240
(58) Field of Classification Search ............... 709/202, 709/203, 225, 240
See application file for complete search history.

(56) References Cited

U.S. PATENT DOCUMENTS

| | | | |
|---|---|---|---|
| 5,515,508 A | 5/1996 | Pettus et al. | |
| 5,999,979 A | 12/1999 | Vellanki et al. | |
| 6,513,061 B1* | 1/2003 | Ebata et al. | 709/203 |
| 6,792,461 B1* | 9/2004 | Hericourt | 709/225 |
| 6,925,481 B2* | 8/2005 | Singhal et al. | 709/200 |
| 2002/0002581 A1* | 1/2002 | Siddiqui | 709/202 |
| 2002/0069241 A1* | 6/2002 | Narlikar et al. | 709/203 |
| 2002/0138565 A1* | 9/2002 | Kustov et al. | 709/203 |
| 2002/0165928 A1* | 11/2002 | Landfeldt et al. | 709/213 |
| 2004/0054805 A1* | 3/2004 | Sen et al. | 709/240 |

FOREIGN PATENT DOCUMENTS

EP    1 180 885 A1    2/2002

OTHER PUBLICATIONS

Wireless Application Protocol Forum, Ltd., "Provisioning User Agent Behaviour", Version 14, Mar. 2001, Wireless Application Protocol WAP-185-ProvUAB-20010314-a, pp. 1-21.
Wireless Application Protocol Forum, Ltd., "Provisioning Content", Version 24, Jul. 2001, Wireless Application Protocol WAP-183-ProvCont-20010724-a, pp. 1-59.

* cited by examiner

*Primary Examiner*—Jinsong Hu
(74) *Attorney, Agent, or Firm*—Blakely Sokoloff Taylor & Zafman LLP (57) ABSTRACT

In a mobile device operating on a wireless network, one of multiple selectable proxies and its corresponding protocol stack are selected, to proxy a request and response, based on the application making the request. Connection information for each available proxy is stored in a configuration store. The application requests a Net Proxy object for the particular proxy and protocol stack to be used. The Net Proxy object contains a subset of the stored connection information specific to the particular proxy. An HttpAction object is then created for the request, and the Net Proxy object is linked to the HttpAction object. The HttpAction object is provided to a request manager, which dispatches the request to an appropriate protocol stack, based on the content of the net Proxy object linked to the HttpAction object, which causing the request to be sent to the selected proxy.

35 Claims, 7 Drawing Sheets

APPLICATION-BASED PROTOCOL AND PROXY SELECTION BY A MOBILE DEVICE IN A MULTI-PROTOCOL NETWORK ENVIRONMENT

FIELD OF THE INVENTION

At least one embodiment of the present invention pertains to computer networking, and more particularly, to application-based protocol and proxy selection by a mobile device in a multi-protocol network environment.

BACKGROUND

Personal mobile communication/computing devices such as cellular telephones, personal digital assistants (PDAs), two-way pagers and the like have become ubiquitous in many countries. These devices are sometimes collectively called "mobile devices". Many of the latest generation mobile devices provide their users with the ability to access resources on the Internet via wireless telecommunications networks ("wireless networks"). For example, some of these mobile devices allow their users to access World Wide Web pages, exchange email and/or instant messages, and download files over the Internet.

A proxy server (or "proxy") is often used to facilitate access by mobile devices to the Internet. The proxy relays ("proxies") requests and responses between mobile devices (clients) on the wireless network and servers on the Internet. Typically, the proxy is implemented in a conventional server-class computer system that is coupled between the wireless network and the Internet. This computer system may also include a gateway that translates/converts between the languages and protocols used on the Internet and the languages and protocols used by mobile devices. For example, the Internet is based mainly on the use of hypertext transfer protocol (HTTP) and languages such as hypertext markup language (HTML) and extensible markup language (XML); mobile devices, on the other hand, commonly use wireless access protocol (WAP) and wireless markup language (WML) for purposes of Internet access.

We are now in a time of transition, where we are moving from a time in which the WAP stack was the primary way for mobile devices to access Internet-based content to one in which HTTP is commonly used. This transition cannot be made instantaneously, however. Different network operators will install different network infrastructure in their various networks at different times. Networking protocols can be very complex, and manufacturers do not want to have to offer mobile devices with different networking protocols for different wireless carriers. Carriers do not want customers to be unable to use newer infrastructure when it is installed, nor do carriers want to have to maintain older infrastructure to accommodate customers who have not upgraded their phones in several years.

For these reasons and others, it is desirable to have a system that allows an application on a mobile device to select the most appropriate proxy and protocol for what it is trying to do. It is also desirable to have a system that enables a wireless carrier to provision and change what proxy and/or protocol should be used for each application.

Certain technologies exist which are partial solutions at best, but fall short of achieving these goals. For example, the concept of sockets provides the ability to use a single abstract networking interface to communicate over multiple protocols. In that approach, one creates a socket and specifies whether it should be a stream or a datagram socket, what type of addressing one expects to use, and optionally a specific protocol to use. If one does not specify the protocol, the implementation uses the socket type and addressing type to determine the protocol. For example, a stream socket with Internet addressing is interpreted to mean that transmission control protocol (TCP) is to be used, while a stream socket with NetWare addressing means to use sequenced packet exchange (SPX). However, in part because the client must specify the address and port number, the model used by sockets is too low-level and simplistic and offers no flexibility for provisionable behavior (i.e., the ability for a network operator to tell a client which proxies are best-suited for which applications).

The WAP forum has specified an end-to-end security framework that provides for dynamic proxy navigation; see "WAP Transport Layer End-to-End Security", WAP-187-TransportE2ESec-20010628-a, WAP Forum, Jun. 28, 2001. In this framework, an origin server can send a navigation document to a client requesting that it create a session through an alternate gateway. In this scenario, all traffic is presumed to travel through that proxy until the user navigates away from the domain of the server that requested the change. However, the framework provides no ability for a client application to select the most appropriate proxy and/or protocol, nor does it support provisioning of selectable proxies.

Some browsers used in mobile devices allow selection of a proxy from a list of proxies. However, there is still no ability to provision, or to select in a mobile device, the most appropriate proxy or protocol for any of multiple applications in the mobile device.

SUMMARY OF THE INVENTION

The present invention includes a mobile device that operates on a wireless network and a method for operating the mobile device. The method includes executing an application in the mobile device, and selecting a proxy, based on a need of the application, from among multiple proxies that can be selected by the mobile device, to proxy a communication between the mobile device and a processing system that is remote from the mobile device.

Other features of the present invention will be apparent from the accompanying drawings and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for application-based protocol and proxy selection by a mobile device in a multi-protocol network environment are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in detail below, the invention makes it possible for a mobile device operating on a wireless network to access multiple proxies over multiple protocols to proxy a request and response, in particular making it possible to select the most appropriate proxy and protocol based on the application making the request. For example, a browser may select a proxy that uses the HTTP stack to handle a request, whereas a messaging application might select a different proxy that uses the WSP stack to process the request.

In certain embodiments, connection information for each available proxy is stored in a configuration store. The application requests a proxy object for the particular proxy and protocol stack to be used. The proxy object contains a subset of the stored connection information specific to the particular proxy. An action object is then created for the request, and the proxy object is linked to the action object. The action object is provided to a request manager, which dispatches the request to the appropriate protocol stack, based on the content of the proxy object linked to the action object, causing the request to be sent to the selected proxy.

This approach provides several benefits, including:
the ability to conform to the network environment in which a mobile device finds itself, where it is not known when the mobile device is created which protocol (e.g., HTTP or WSP) will be used;
the ability to provision proxies for particular types of use, which allows network load to be spread across multiple gateways and eases billing differentiation between different service types; and
the ability for an application to communicate with a particular proxy outside the wireless network, for added security, without disturbing other applications' access through other gateways.

Current technology such as the sockets approach provides a low-level interface to allow applications to directly communicate with multiple processes on multiple machines at the same time, but does not provided the above-noted features. Note that the technique introduced herein operates at a higher-level of the ISO/OSI reference model, i.e., at the layers above the transport layer.

Figure 1:
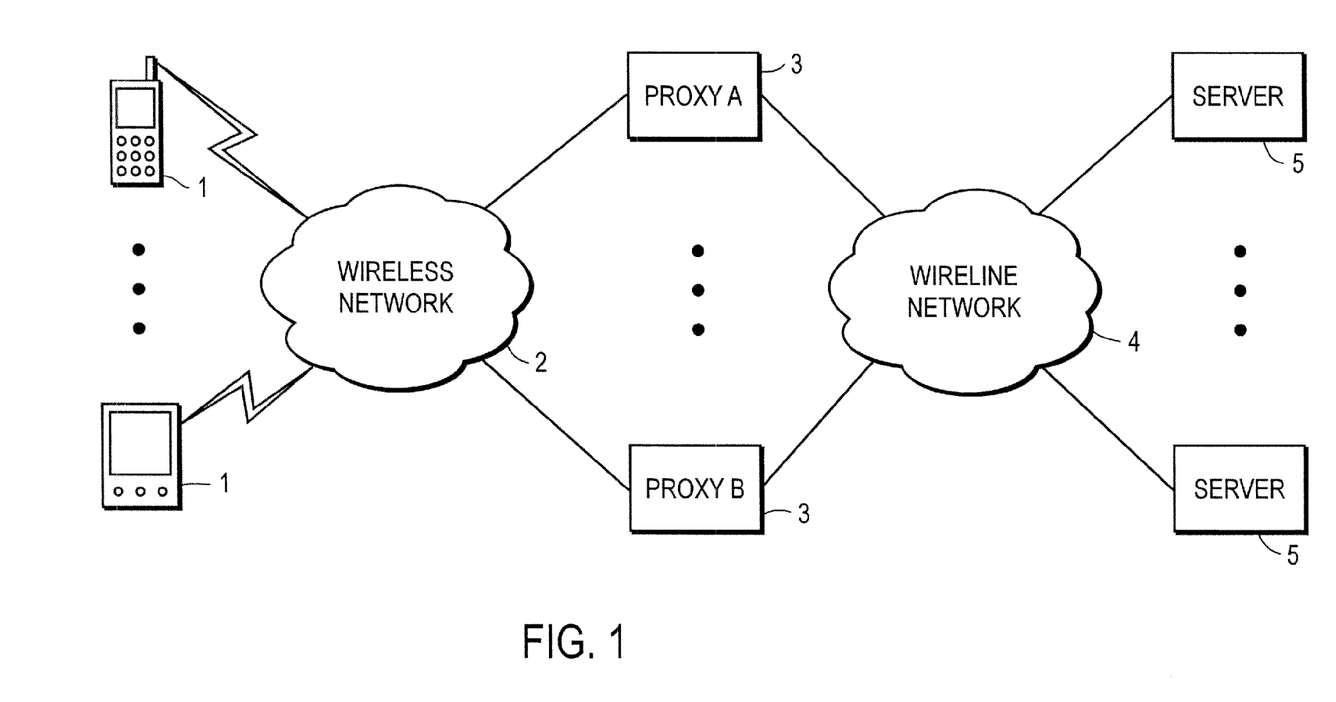
FIG. 1 illustrates a network in which the invention can be implemented.

FIG. 1 shows an example of a network environment in which the invention can be implemented. A number of mobile devices 1 operate on a wireless network 2. Each of the mobile devices 1 may be, for example, a cellular telephone, a PDA, or a two-way pager, or the like. Two or more proxies 3 are connected between the wireless network 2 and a wireline computer network 4. Each of the proxies 3 is configured to communicate with mobile devices 1 over the wireless network 2 using a different protocol. For example, Proxy A may be configured to use HTTP while Proxy B is configured to use WSP. Various servers 5 are connected to the wireline network 4 and are accessible to applications running on the mobile devices 1. Each of the servers 5 may be, for example, a Web server, application server, file server, or the like. In certain embodiments, the wireline network 4 is the Internet, as is henceforth assumed in this description to facilitate explanation. In other embodiments, however, the wireline network 4 could be a type of network other than the Internet, such as a private intranet or other wide area network (WAN), a local area network (LAN), or combination of such networks. Note that to simplify description, FIG. 1 shows only two of each of the mobile devices 1, the proxies 3 and the servers 5; however, the invention is not limited to any particular number of any of these devices in a given network configuration.

Figure 2:
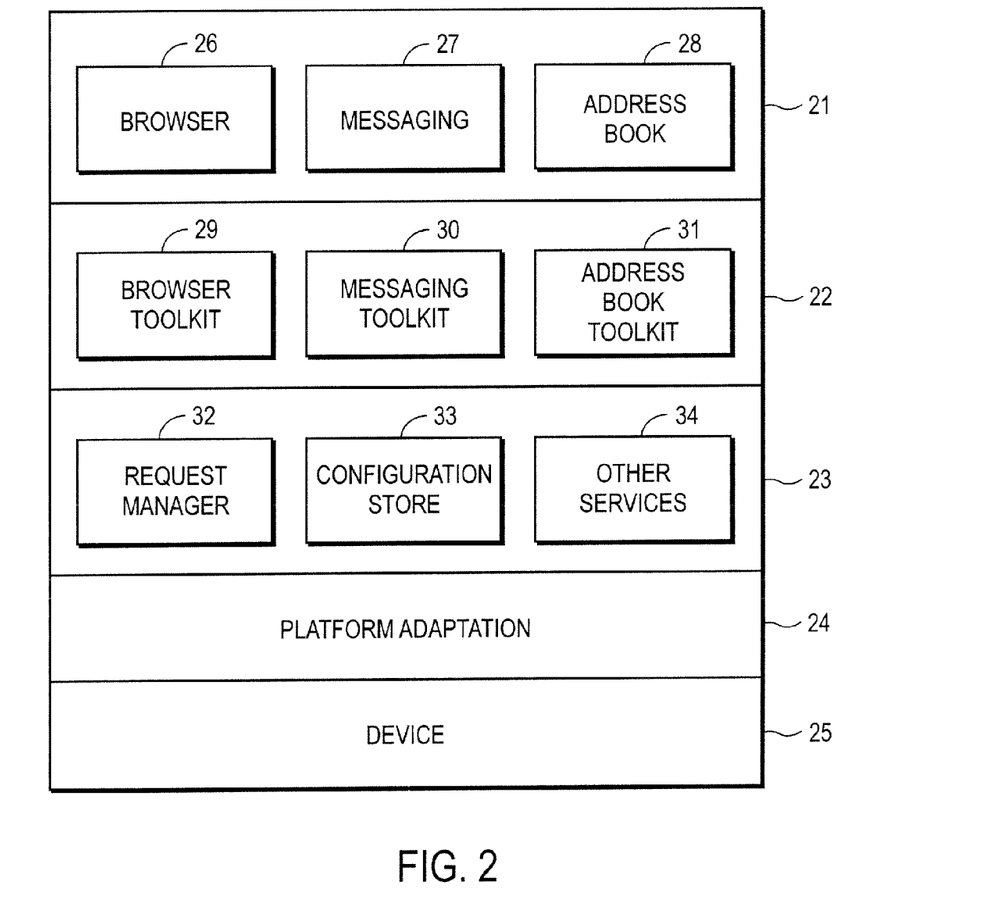
FIG. 2 is a high-level representation of the software architecture of a mobile (client) device.

FIG. 2 is a high-level representation of the software architecture of a mobile (client) device 1, according to certain embodiments of the invention. The highest level of software in the mobile device is the application layer 21, which includes a number of different applications, such as a browser 26, a messaging application 27 (e.g., for instant messaging), and an address book 28. Any of various other applications may also (or alternatively) be included. Below the application layer 21 is the toolkit layer 22, which includes a toolkit (i.e., a group of special-purpose services) for each of the supported applications, e.g., a browser toolkit 29, a messaging toolkit 30, an address book toolkit 31, etc.

Below the toolkit layer 22 is the services layer 23. The services layer 23 includes a request manager 32, a configuration store 33, and other services 34 which are not germane to the invention. The request manager 32 and configuration store 33 are used to implement the intelligent proxy/protocol selection technique introduced herein, as described further below. In general, the request manager 32 provides an application with HTTP-like access to external services. The request manager 32 handles the management of multiple requests, coping with authentication and redirection issues, and serves as a front-end to the individual protocol stacks, shuttling requests to them, and shuttling response data back to the originating application. The configuration store 33 holds information including various pieces of configuration state (e.g., home page, default gateway, encryption keys), including the parameters that can be provisioned, as well as state created at run time. Other services 34 may include, for example, media and graphics services, application management services, etc.

Below the services layer 23 is the platform adaptation layer 24, which provides interface between the services layer 23 and the lowest layer of software, the device layer 25.

Figure 3:
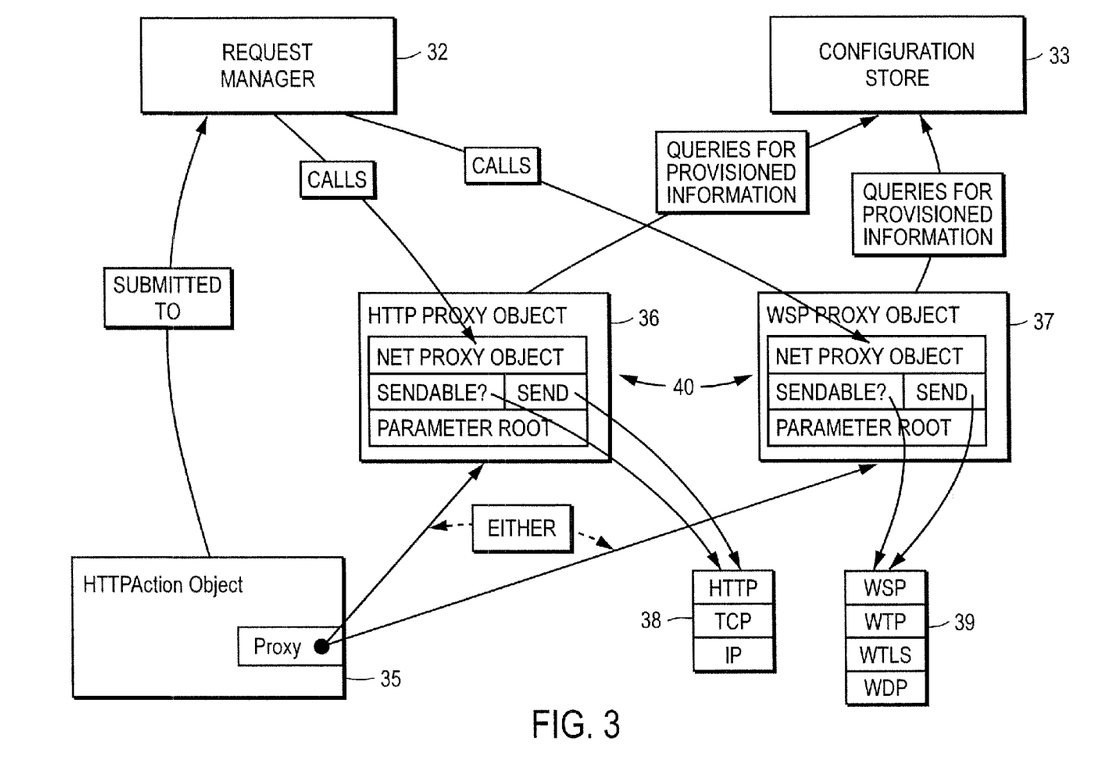
FIG. 3 is a block diagram showing the interaction between certain software components and objects in the mobile client.

As will now be further described, the features of the invention are provided mostly if not entirely by one or more applications, the request manager 32 and the configuration store 33 in a mobile device 1. Refer to FIG. 3, which illustrates the interaction between these elements and certain objects in a mobile (client) device 1. In addition to the request manager 32 and the configuration store 33, FIG. 3 shows instances of several object types, including an HttpAction object 35, an HTTP proxy object 36, and a WSP proxy object 37. These are "objects" in an object-oriented programming sense, i.e., an object is an instantiation of a class defined in an object-oriented programming language, such as Java or C++.

The HTTP Proxy Object 36 and the WSP proxy object 37 are both specializations of a class referred to as Net Proxy. Net Proxy objects 40 maintain a count of references to them. A single Net Proxy object may be used by multiple applications simultaneously.

An HTTP Proxy object 36 encapsulates a connection to a single external HTTP proxy (i.e., one with which a mobile device communicates literally over HTTP). This object is the gateway to the HTTP protocol stack 38. A WSP Proxy object 37 encapsulates a connection to a single external WSP proxy (i.e., one with which a mobile device communicates using WSP). This object is the gateway to the WAP protocol stack 39. Other embodiments of the invention may support proxies that use other protocols; such embodiments would provide a different specialization of the Net Proxy object 40 for each such protocol.

An HttpAction Object 35 is the object which is used to encapsulate a request and is the form of information managed by the request manager 32. An HttpAction object 35 contains all of the information needed to process a single request. Each HTTP request has various pieces of state, all of which are contained in the HttpAction object 35. Examples of such state include the uniform resource locator (URL) being accessed, the number of redirects, the line type, etc. Within each HttpAction object is a pointer to the particular network proxy 3 to use to service the request, and more specifically, a pointer to a particular Net Proxy object 40.

When an application wishes to access resources on the Internet, it constructs an HttpAction object 35 and populates it with the particulars of the request, e.g., what resource is desired, what method to invoke, and what headers to send. As part of this object, the application specifies a Net Proxy object 40 (e.g., an HTTP proxy object 36 or a WSP proxy object 37) that dictates which proxy 3 and protocol are used to service the request. The system maintains one or more Net Proxy objects 40 that contain the necessary state for, and route requests to, the proper protocol stack.

To select a proxy 3 and protocol, an application in a mobile device 1 can obtain a Net Proxy object 40 on the basis of any of various criteria, such as:

the system default proxy (which may be set via provisioning)
the default proxy for a particular protocol
the proxy for a certain type of access, e.g. browsing, multimedia messaging system (MMS), synchronization, provisioning
the proxy for a particular URL/domain
a proxy with a particular address For all but the final criterion above, the information about the proxy 3 is stored in the configuration store, from which the Net Proxy object 40 populates its state. The system default proxy is typically governed by the carrier through a provisioning protocol and allows a mobile device 1 to easily roam from a network where only WAP protocols are supported to one where both WAP and HTTP are supported or only HTTP is supported.

In servicing a particular request, the request manager 32 uses the Net Proxy object 40 that is bound to the HttpAction object 35 to communicate with the proper protocol stack. As shown in FIG. 3, there are two functions the request manager 32 can call on a Net Proxy object 40: The first is called Sendable?, which checks whether the protocol stack can process the request; the second is called Send, which gives the request to the protocol stack to process. Data flowing back from the protocol stacks are passed to the request manager 32 using a functional application programming interface (API) that has no need for the indirection provided by the Net Proxy objects 40.

The following example illustrates one possible way of storing in the configuration store 33 the information for a system that uses one proxy via HTTP for secure provisioning, a second proxy via WSP for browsing, and a third proxy via WSP for retrieving MMS messages:

phone:proxy..0.address..0.address=128.211.106.4
phone:proxy..0.address..0.port=8088
phone:proxy..0.address..0.e2eport=8086
phone:proxy..1.address..0.wdp=c40023f30a1057c3
phone:proxy..1address..1.wdp=c40023f30a1057b8
phone:proxy..2.address..0.wdp=c40023f30a106318
app:browser.to-proxy=1
app:prov.to-proxy=0
app:mms.to-proxy=2

In the above example, the configuration store 33 uses a hierarchical name/value format. The proxies 3 are identified in the above example as proxy..0, proxy..1 and proxy..2. So, a request for the MMS proxy, for example, would fetch the value associated with the name, app:mms.to-proxy, then use that to locate the appropriate entry in the phone:proxy array from which to initialize a Net Proxy object 40. The WSP persistent state is stored as other keys under phone:proxy..2, such as phone:proxy..2.session and phone:proxy..2.keys.

Figure 4:
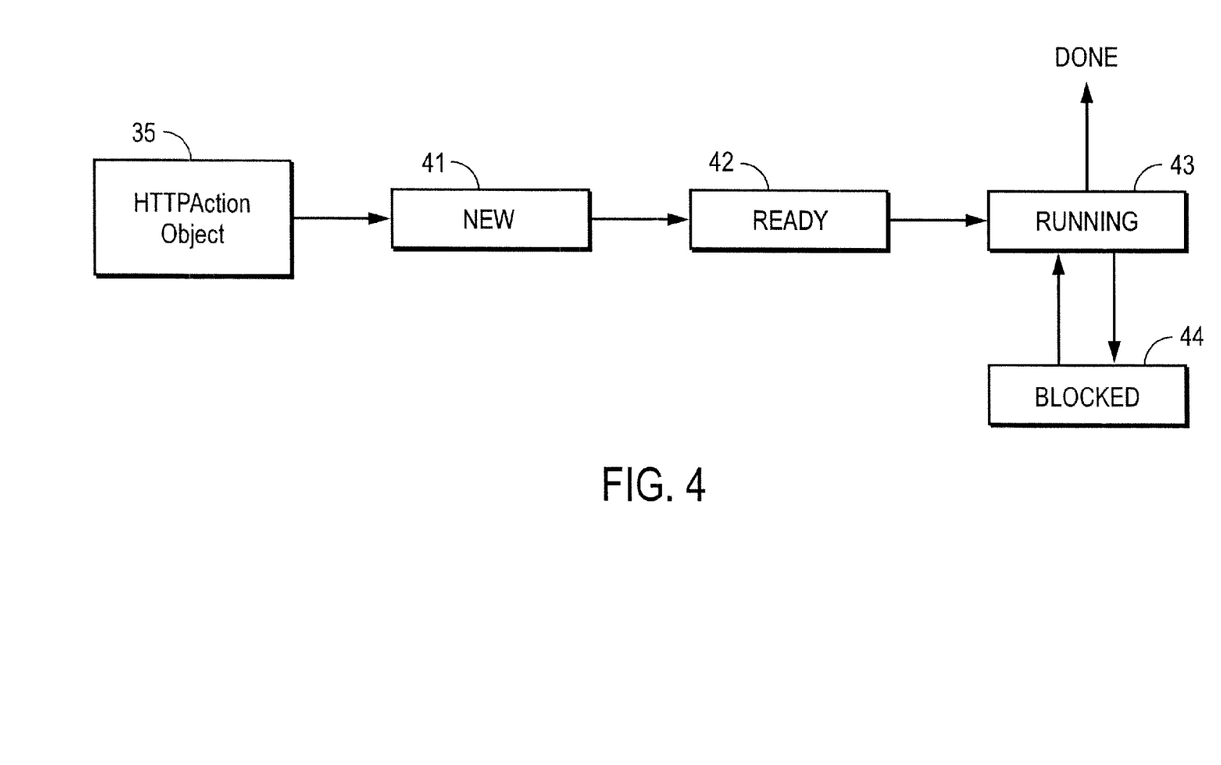
FIG. 4 shows a process of transferring an HttpAction object through the various queues of the request manager.

Referring now to FIG. 4, in certain embodiments of the invention, the request manager 32 uses four queues 41-44 to keep track of the requests under its stewardship. A separate queue is used for each of the states a request may have: New, Ready, Running, and Blocked. The New queue 41 contains requests freshly created. Little or no processing or validation of the request has been done at this stage; it is just a transient state for the request, so that the request manager 32 can exit out of the current event and avoid recursing back into the caller.

From the New state the request may become complete and exit the request manager 32 or transition to the Ready queue 42. If the request is for special case, local resource such as local multipart, files, or JAM images, the request manager 32 will try to service it while iterating through the new requests and will fail it immediately if it cannot be filled. All other requests are transferred to the Ready queue 42 to wait for servicing by the network. By the time a request is considered ready, it is expected to be valid enough so that it will not to cause undesirable effects down the line. For example, it is assumed that it will have a uniform resource identifier (URI) of some sort and the presence or absence of the request entity makes sense for the request method.

The request is moved from the Ready queue 42 to the Running queue 43 when it is able to be handled by the selected protocol stack. The Running queue 43 is purely for accounting purposes, i.e., to allow the request manager 32 to keep track of the requests it is handling. The only time it is needed is when a request is canceled. The request manager 32 must know whether to call into a selected protocol stack to cancel the request or whether it can simply remove it from one of its staging cues (i.e., New 41 or Ready 42).

While a request is running it may require additional processing so as to become Blocked. Blocked transactions may require user input or additional out-of-band transactions before the requester's transaction properly can be completed. An example of such a situation is World Wide Web authentication. Like the Running queue 43, the Blocked queue 44 only exists for accounting purposes.

Figure 5:
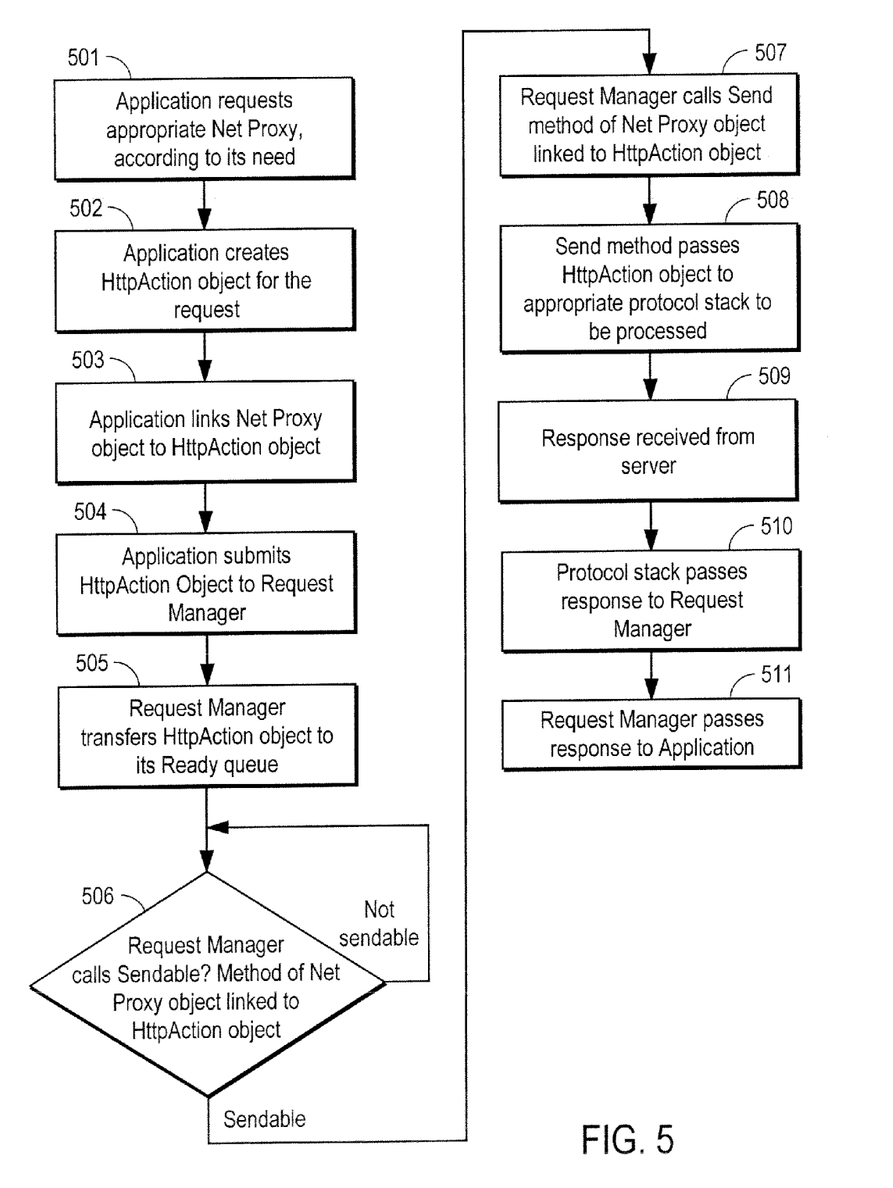
FIG. 5 is a flow diagram showing a process of selecting a proxy for a request and sending the request, in a mobile client.

FIG. 5 shows a process, in a mobile device 1, of selecting a proxy 3 for a request and sending the request, according to certain embodiment of the invention. At block 501 an application executing in a mobile device 1 requests and receives a Net Proxy object 40 appropriate for its need (e.g., according to the type of application it is and/or any of the criteria mentioned above). The requested Net Proxy object 40 corresponds to a particular proxy 3 and a particular protocol, as described above. At block 502 the application creates an HttpAction object 36 for a request that is to be submitted to a server 5 via that proxy 3. At block 503 the application links the Net Proxy object 40 to the HttpAction object 35, such that the HttpAction object 35 contains a pointer to the Net Proxy object 40. The application then submits the HttpAction object 35 to the request manager 32 at block 504. The request manager 43 subsequently transfers the HttpAction object 35 from its New queue 41 to its Ready queue 42 at block 505.

Next, at block 506 the request manager 32 calls the Sendable? method of the Net Proxy object 40 linked to the HttpAction object 35. Note that the request manager 32 can maintain a separate Ready queue 42 for each protocol stack, or it can maintain a single Ready queue 42 containing the requests bound for all protocol stacks. To address any potential issues with multiple proxies needing to use the same resource (a circuit-switched connection, for example) where only one of them can use it at a time, additional queueing logic can be provided to locate the next request for the same proxy, prompt the user to terminate the connection to the other proxy, etc.

When the Sendable? method returns a value of True, the request manager 32 calls the Send method of the Net Proxy object 40 at block 507. The Send method passes the HttpAction object 35 to the appropriate protocol stack (according to the Net Proxy object 40) at block 508, to be processed (i.e., to be sent to the appropriate proxy 3). At block 509 a response to the request is received from the designated server 5, typically via the same proxy 3. The appropriate protocol stack passes the response to the request manager 32 at block 510, which passes the response to the application which generated the request at block 511.

Figure 6:
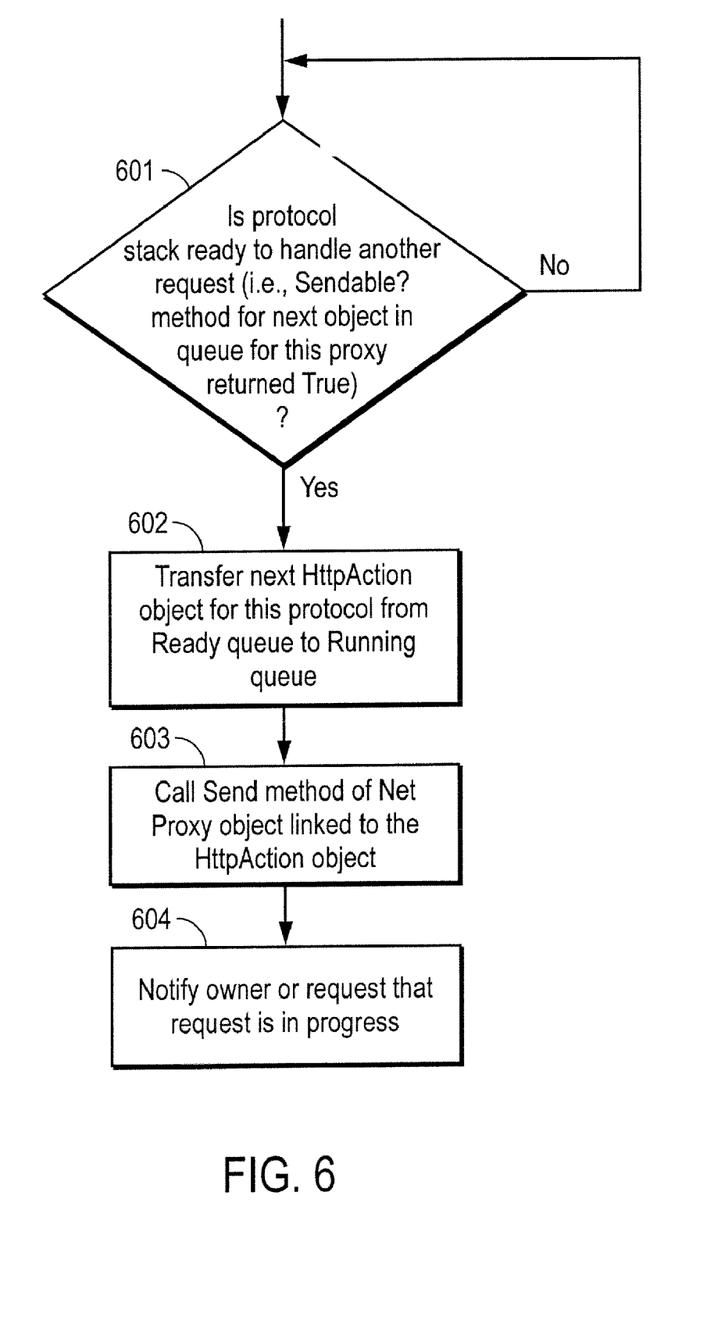
FIG. 6 is a flow diagram showing a process by which the request manager handles the request.

FIG. 6 shows in greater detail a portion of the process by which the request manager 32 handles a request, according to certain embodiment of the invention. At block 601, the request manager 32 determines whether a given protocol stack (e.g., HTTP or WSP) is ready to handle another request. If so, then at block 602 the request manager 32 transfers the next HttpAction object 35 for that protocol stack from its Ready queue 42 to its Running queue 43. At block 603 the request manager 32 calls the Send method of the Net Proxy object 40 linked to the HttpAction object 35. At block 604 the request manager 32 notifies the owner of the request (i.e., the initiating application) that the request is in progress.

The above described processes can be better understood by considering the following practical example. This example tracks the lifetime of a browser in a mobile device 1 to show how the browser would create and manipulate the various objects.

1. At startup, the browser asks for the Net Proxy object 40 to use for browsing. The browser saves this object for use while the browser is active.
2. In response to the user requesting a web page, the browser creates an HttpAction object 35 for the page itself, and links the Net Proxy object 40 from step 1 to the HttpAction object 35. The browser then submits the HttpAction object 35 to the request manager 32 for processing.
3. When the HttpAction object 35 is at the head of the Ready queue 42, i.e. the next in line to be processed, the request manager 32 calls the Sendable? method of the Net Proxy object 40 linked to the HttpAction object 35 and, when it returns True, calls the Send method of the Net Proxy object 40.
4. The Send method passes the HttpAction object 35 to the proper protocol stack, assumed here to be WSP, to be processed.
5. When the response to the request is received by the mobile device, the WSP protocol passes the response information to the request manager 32, which hands it back to the browser.
6. The browser processes the returned page and determines that it needs to fetch a number of images (it may do this as the initial page is being returned). For each image, the browser creates an HttpAction object 35, links the Net Proxy 40 retrieved in step 1 to it, and submits the HttpAction object 35 to the request manager 32.
7. When the browser is terminated, it decrements the reference count on its Net Proxy object 40, which causes the object to be destroyed if there are no further references to it.

As will be apparent from the preceding discussion, the technique introduced above can be implemented in software, which can be executed in processing systems using conventional hardware. Hence, referring again to FIG. 1, each of the processing systems described above (i.e., the mobile devices 1, the proxies 3, and the servers 5) can be conventional in terms of their hardware. Alternatively, the techniques described above can be implemented in circuitry specially designed for such purposes, or in a combination of specially designed circuitry and software executed by conventional hardware.

Figure 7:
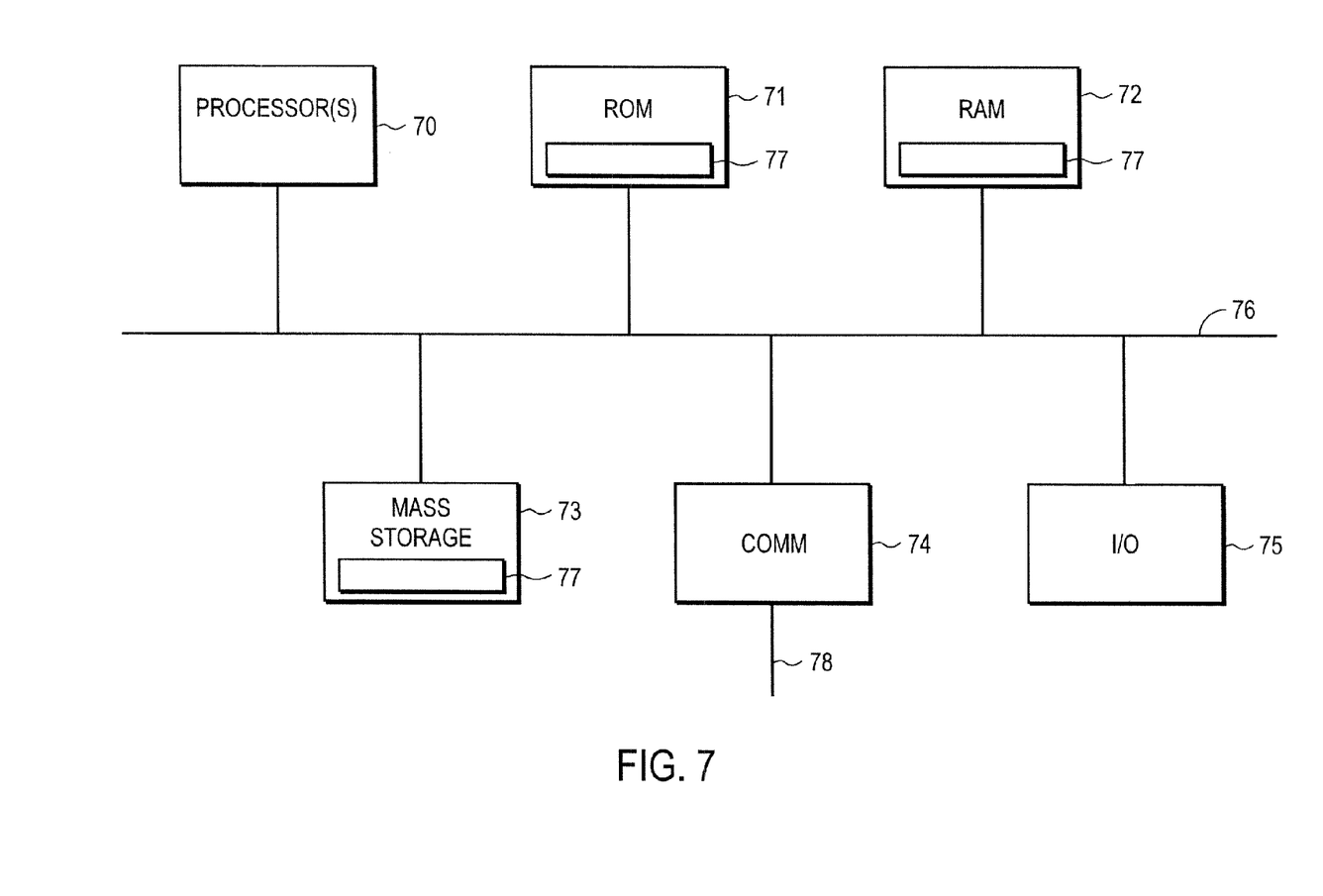
FIG. 7 is a high-level block diagram showing a processing system representative of any of the processing systems shown in FIG. 1.

FIG. 7 is a high-level block diagram of a processing system representative of any of the processing systems mentioned above. Note that FIG. 7 is a conceptual representation which represents any of numerous specific physical arrangements of hardware components; however, the details of such arrangements are not germane to the present invention and are well within the knowledge of those skilled in the art. Also note that, in certain embodiments, some of the above-mentioned processing systems may be distributed between two or more separate physical platforms.

The processing system shown in FIG. 7 includes one or more processors 70, i.e. a central processing unit (CPU), read-only memory (ROM) 71, and random access memory (RAM) 72, each connected to a bus system 76. The processor(s) 70 may be, or may include, one or more programmable general-purpose or special-purpose microprocessors or digital signal processors (DSPs), microcontrollers, application specific integrated circuits (ASICs), programmable logic devices (PLDs), or a combination of such devices. The bus system 76 includes one or more buses or other physical connections, which may be connected to each other through various bridges, controllers and/or adapters such as are well-known in the art. For example, the bus system 76 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

In alternative embodiments, some or all of the aforementioned components may be connected to each other directly, rather than through a bus system.

Also coupled to the bus system 76 are a mass storage device 73, a data communication device 74, and in some embodiments, one or more additional input/output (I/O) devices 75.

The mass storage device 73 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices.

The communication device 74 is a device suitable for enabling the processing system to communicate data with a remote processing system over a communication link 78, and may be, for example, a conventional telephone modem, a wireless modem, an Integrated Services Digital Network (ISDN) adapter, a Digital Subscriber Line (DSL) modem, a cable modem, a radio transceiver, a satellite transceiver, an Ethernet adapter, or the like.

The I/O devices 75 may include, for example, one or more devices such as: a pointing device such as a mouse, trackball, touchpad, or the like; a keyboard; audio speakers; and/or a display device such as a cathode ray tube (CRT), a liquid crystal display (LCD), or the like. However, such I/O devices may be omitted in a system that operates exclusively as a server and provides no direct user interface. Other variations upon the illustrated set of components can be implemented in a manner consistent with the invention.

Software (including instructions and data) 77 to implement the techniques described above may be stored in one or more of ROM 71, RAM 72, and mass storage device 73. In certain embodiments, the software 77 may be initially provided to the processing system by downloading it from a remote system through the communication device 74.

Thus, a method and apparatus for application-based protocol and proxy selection by a mobile device in a multi-protocol network environment have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a mobile device on a wireless network, the method comprising:
   executing an application in the mobile device; and
   in the mobile device, selecting a proxy, based on a need of the application, from among a plurality of proxies selectable by the mobile device, to proxy a communication between the mobile device and a processing system that is remote from the mobile device,
   wherein the plurality of proxies comprises a first proxy configured to communicate with the mobile device via HTTP and a second proxy configured to communicate with the mobile device via a wireless communication protocol.

2. A method as recited in claim 1, wherein said selecting a proxy comprises selecting one of a plurality of selectable protocol stacks for communication between the mobile device and the proxy.

3. A method as recited in claim 2, wherein said selecting is done by the application.

4. A method as recited in claim 3, further comprising: executing a second application in the mobile device; and the second application selecting another proxy of the plurality of selectable proxies, based on a need of the second application.

5. A method as recited in claim 2, wherein the plurality of selectable protocol stacks includes an HTTP stack and a WSP stack.

6. A method as recited in claim 5, wherein the wireless communication protocol includes WSP.

7. A method as recited in claim 1, wherein said selecting a proxy comprises selecting a proxy to meet a particular protocol requirement of the application.

8. A method as recited in claim 1, wherein said selecting a proxy comprises selecting a proxy for a particular type of network access as specified by the application.

9. A method as recited in claim 1, wherein said selecting a proxy comprises selecting a proxy for a particular network domain.

10. A method as recited in claim 1, further comprising creating a proxy object based on said need of the application, the proxy object containing connection information for the selected proxy.

11. A method as recited in claim 10, further comprising:
    linking the proxy object to an action object; and
    processing the action object by dispatching an access request to one of a plurality of selectable protocol stacks according to the proxy object, to access the selected proxy.

12. A method of operating a mobile device on a wireless network, the method comprising:
    storing connection information for a plurality of proxies selectable by the mobile device, each of the proxies to provide mobile devices with access to a wireless data network;
    executing an application in the mobile device;
    in the mobile device, instantiating a proxy object of a class determined based on a need of the application to access the wireless data network, the proxy object containing a subset of the stored connection information specific to a particular one of the proxies that is appropriate for said need;
    linking the proxy object to an action object;
    placing the action object into a queue to be processed; and
    processing the action object by dispatching an access request to one of a plurality of selectable protocol stacks according to content of the proxy object, said one of the protocol stacks causing the access request to be sent to said particular one of the proxies,
    wherein the plurality of proxies comprises a first proxy configured to communicate with the mobile device via HTTP and a second proxy configured to communicate with the mobile device via a wireless communication protocol.

13. A method as recited in claim 12, wherein said instantiating the proxy object is caused by the application.

14. A method as recited in claim 12, wherein the plurality of selectable protocol stacks includes an HTTP stack and a WSP stack.

15. A method as recited in claim 14, wherein the wireless communication protocol includes WSP.

16. A method as recited in claim 12, wherein the particular one of the proxies is selected to meet a particular protocol requirement of the application.

17. A method as recited in claim 12, wherein the particular one of the proxies is selected to provide a particular type of network access as specified by the application.

18. A method as recited in claim 12, wherein the particular one of the proxies is selected as a proxy for a particular network domain.

19. A mobile device to operate on a wireless network, the mobile device comprising:
   means for executing an application; and
   in the mobile device, means for selecting a proxy, based on a need of the application, from among a plurality of proxies selectable by the mobile device, to provide the mobile device with access to a wireline data network,
   wherein the plurality of proxies comprises a first proxy configured to communicate with the mobile device via HTTP and a second proxy configured to communicate with the mobile device via a wireless communication protocol.

20. A mobile device configured to operate on a wireless network, the mobile device comprising:
   a processor;
   a communication device coupled to the processor to communicate over the wireless network; and
   a storage facility to store connection information for a plurality of proxies selectable by the mobile device, each of the proxies to proxy communication between one or more mobile devices and one or more servers, the storage facility further to store an application for execution in the mobile device, and further to store instructions which when executed by the processor cause the processor to perform a process comprising,
   in response to the application having a need to access a resource on a wireline data network, in the mobile device identifying a particular one of the proxies that is appropriate for said need,
   accessing stored connection information for the particular one of the proxies, and
   using the accessed connection information to send a request to an appropriate one of a plurality of selectable protocol stacks, for transmission to the particular one of the proxies.
   wherein the plurality of proxies comprises a first proxy configured to communicate with the mobile devive via HTTP and send proxy configured to communicate with the mobile device via a wireless communication protocol.

21. A mobile device as recited in claim 20, wherein said accessing stored connection information for the particular one of the proxies comprises selecting one of a plurality of selectable protocol stacks for communication between the mobile device and the proxy.

22. A mobile device as recited in claim 21, wherein the plurality of selectable protocol stacks includes an HTTP stack and a WSP stack.

23. A mobile device as recited in claim 22, wherein the wireless communication protocol includes WSP.

24. A mobile device as recited in claim 20, wherein said identifying a particular one of the proxies is done by the application.

25. A mobile device as recited in claim 24, wherein said identifying a particular one of the proxies comprises identifying a proxy to meet a particular protocol requirement of the application.

26. A mobile device as recited in claim 24, wherein said identifying a particular one of the proxies comprises identifying a proxy for a particular type of network access required by the application.

27. A mobile device as recited in claim 24, wherein said identifying a particular one of the proxies comprises identifying a proxy for a particular network domain.

28. A mobile device as recited in claim 20, further comprising creating a proxy object from a class selected based on said need of the application, the proxy object containing connection information for the selected proxy.

29. A mobile device as recited in claim 28, wherein said using the accessed connection information to send a request comprises: linking the proxy object to an action object; and processing the action object by dispatching an access request to one of a plurality of selectable protocol stacks according to the proxy object, to access the selected proxy.

30. A mobile device as recited in claim 20, wherein the particular one of the proxies is selected to meet a particular protocol requirement of the application.

31. A mobile device as recited in claim 20, wherein the particular one of the proxies is selected to provide a particular type of network access as specified by the application.

32. A mobile device as recited in claim 20, wherein the particular one of the proxies is selected as a proxy for a particular network domain.

33. A mobile device configured to operate on a wireless network, the mobile device comprising:
   a configuration store containing connection information for a plurality of proxies selectable by the mobile device to provide the mobile device with access to a wireline data network;
   an application to execute in the mobile device, such that when the application has a need to access the wireline data network, the application causes in the mobile device a proxy object to be instantiated from a class selected according to said need, the proxy object containing connection information, from the configuration store, specific to a particular one of the proxies that is appropriate for said need; and
   a request manager to receive an action object linked to the proxy object, and to use the proxy object linked to the action object to send an access request to one of a plurality of selectable protocol stacks, said one of the protocol stacks corresponding to said particular one of the proxies,
   wherein the plurality of proxies comprises a first proxy configured to communicate with the mobile device via HTTP and a second proxy configured to communicate with the mobile device via a wireless communication protocol.

34. A mobile device as recited in claim 33, wherein the plurality of selectable protocol stacks includes an HTTP stack and a WSP stack.

35. A mobile device as recited in claim 34, wherein the wireless communication protocol includes WSP.

* * * * *